(12) United States Patent
Garland

(10) Patent No.: US 6,366,359 B1
(45) Date of Patent: *Apr. 2, 2002

(54) INTEGRATED DIGITAL TELEVISION AND VIDEO PRINTER

(75) Inventor: Harry T. Garland, Los Altos Hills, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,052

(22) Filed: Apr. 9, 1998

(51) Int. Cl.⁷ .............................................. G06F 15/00
(52) U.S. Cl. ..................... 358/1.15; 358/1.9; 358/1.17; 358/1.13
(58) Field of Search .................... 395/114, 115, 395/116, 112; 358/1.15, 1.16, 1.17, 1.18, 1.13, 1.9

(56) References Cited

U.S. PATENT DOCUMENTS

| | | | |
|---|---|---|---|
| 4,148,066 A | | 4/1979 | Saylor .......................... 358/127 |
| 4,459,616 A | | 7/1984 | Lemke .......................... 358/244 |
| 4,484,231 A | | 11/1984 | Eguchi .......................... 358/296 |
| 4,587,569 A | | 5/1986 | Nakamura et al. ........... 358/296 |
| 4,626,926 A | | 12/1986 | Nakamura .................... 358/296 |
| 4,635,132 A | | 1/1987 | Nakamura .................... 358/296 |
| 4,855,833 A | * | 8/1989 | Kageyama et al. ........... 358/183 |
| 4,998,215 A | | 3/1991 | Black et al. .................. 364/519 |
| 5,019,915 A | | 5/1991 | Fujito ........................... 358/335 |
| 5,111,285 A | | 5/1992 | Fujita et al. .................. 358/75 |
| 5,341,174 A | | 8/1994 | Xue et al. ..................... 348/576 |
| 5,497,204 A | | 3/1996 | Ko ................................ 348/715 |
| 5,696,593 A | * | 12/1997 | Chiba et al. .................. 358/296 |
| 5,801,785 A | * | 9/1998 | Crump et al. ................ 348/563 |
| 5,838,383 A | * | 11/1998 | Chimoto et al. ............. 348/553 |

OTHER PUBLICATIONS

B. Bhatt, D. Birks, D. Hermreck, "Digital television: making it work", *IEEE Spectrum*, Oct. 1997, pp. 19–28, U.S.A.
"First Low–Cost Printer for Images on Video", Screen Digest Limited, Feb. 1994.
Robert Fox, "TV Print Out", *Communications of the ACM*, Dec. 1993, vol. 36, No. 12, p. 11, ISSN: 0001–0782, U.S.A.
*Computerworld*, Sep. 12, 1983, p. 25, U.S.A.

* cited by examiner

*Primary Examiner*—Joseph Mancuso
*Assistant Examiner*—Douglas Tran
(74) *Attorney, Agent, or Firm*—Fitzpatrick, Cella, Harper & Scinto

(57) ABSTRACT

An integrated digital television and video printer (200) comprises a first decompressor (204) for decompressing a compressed digital video signal corresponding to a real time broadcast, a buffer (212) for storing a compressed digital video signal (202), a synchronizing means (206) for coordinating the display of the real time digital video signal and the stored digital video signal, a second decompressor (214) for decompressing the stored compressed digital video signal received from the buffer (212), a control means (210) for selecting among and printing images corresponding to the digital video signal stored in the buffer (212), a display means (208) for viewing the real time digital video signal and/or the stored digital video signal, and a printing means (216) for producing a hard copy of the selected image from the buffer (212).

14 Claims, 6 Drawing Sheets

INTEGRATED DIGITAL TELEVISION AND VIDEO PRINTER

BACKGROUND OF THE INVENTION

1. Technical Field

The present invention pertains generally to the field of digital televisions and the field of video printers and more particularly, to a system and method for integrating a video printing device and a digital television into a single unit.

2. Background Art

Oftentimes it is desirable to print a hard copy of an image seen on a television during a broadcast. For example, commercials often display address and price information regarding a particular product. Such information, however, is usually displayed only briefly, thus frustrating any attempt by a viewer to write down the information using pencil and paper. Televisions are also frequently being used to incorporate computer functions. Consequently, a user may use the television as a webviewer to access networks, such as the Internet. This increasing use of televisions to integrate computer and television functions further augments the need to be able to print images displayed on the television.

Also of importance is the emergence of digital television, which is revolutionizing the television industry. The current single analog video format having just one resolution and one frame rate is being retired in favor of a multiplicity of digital video formats varying in both resolution and frame rate. This evolution from the present National Television Systems Committee (NTSC) standard to digital television has been compared with the transition from radio to television. Basically, the NTSC standard defines a video frame as containing a total of 525 interlaced lines, such that all the odd lines are scanned before all the even lines at about a 30-Hz frame rate. In contrast, the new Advanced Television Systems Committee (ATSC) standard is more versatile and mandates compressing the video and audio signals as well as using packetized transport for video, audio, and data packets. The resulting compressed video bit stream is modulated for transmission over the air. As a result, the transition from analog NTSC to the compressed digital ATSC high-definition standard completely transforms how a television stores, processes and transmits the new digital television signal. The improved resolution and image quality of digital televisions provide a further incentive for printing high quality images seen on a television.

The prior art has attempted to solve part of this problem through the use of video printers. Conventional video printers allow a user to print a hard copy of an image displayed on a television screen corresponding to a continuous video signal received from a television broadcast. Examples of such video printers are described in U.S. Pat. Nos. 4,626,926 and 5,111,285.

However, conventional video printers suffer from a number of shortcomings. First, conventional video printers are configured to operate in conjunction with televisions based on the analog National Television Systems Committee (NTSC) standard. However, digital televisions based on standards such as the ATSC standard differ significantly from analog NTSC televisions with respect to the signal used, the encoding and decoding of the signal, as well as a myriad of other processing, storage and transmission issues. Consequently, conventional video printers are incapable of operating with digital televisions.

Second, conventional video printers are separate devices which must be attached to a television unit in order to print a hard copy of the television image. As a result, employing a separate printing device to print images from a television increases the space required for the separate television and printer units as well as the inconvenience of and complexity in connecting the separate devices to ensure proper functioning.

Therefore, there is a need for a video printer for digital televisions and more particularly, for a digital television and video printer which are integrated into a single unit.

DISCLOSURE OF INVENTION

The present invention is a system and method for integrating a digital television and video printing system into a single unit. The system comprises a buffer (212) for storing the compressed digital video signal (202), a synchronizing means (206) for coordinating the display of the real time digital video signal and the stored digital video signal, a decompressor (214) for decompressing the compressed digital video signal received from the buffer (212) and transmitting it to the synchronizing means (206), a control means (210) for selecting among and printing the images corresponding to the digital video signal stored in the buffer (212), a display means (208) for viewing the real time digital video signal and/or the stored digital video signal, and a printing means (216) for producing a hard copy of the selected image from the buffer.

A real time compressed digital video signal is transmitted to and stored in the buffer. The stored compressed digital video signal is first sent to the decompressor and then is sent to the synchronizing means, which transmits the digital video signal to the display means. A control means allows a user to selectively view on the display the images corresponding to the stored compressed digital video signal and to print the selected image on the printing means.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
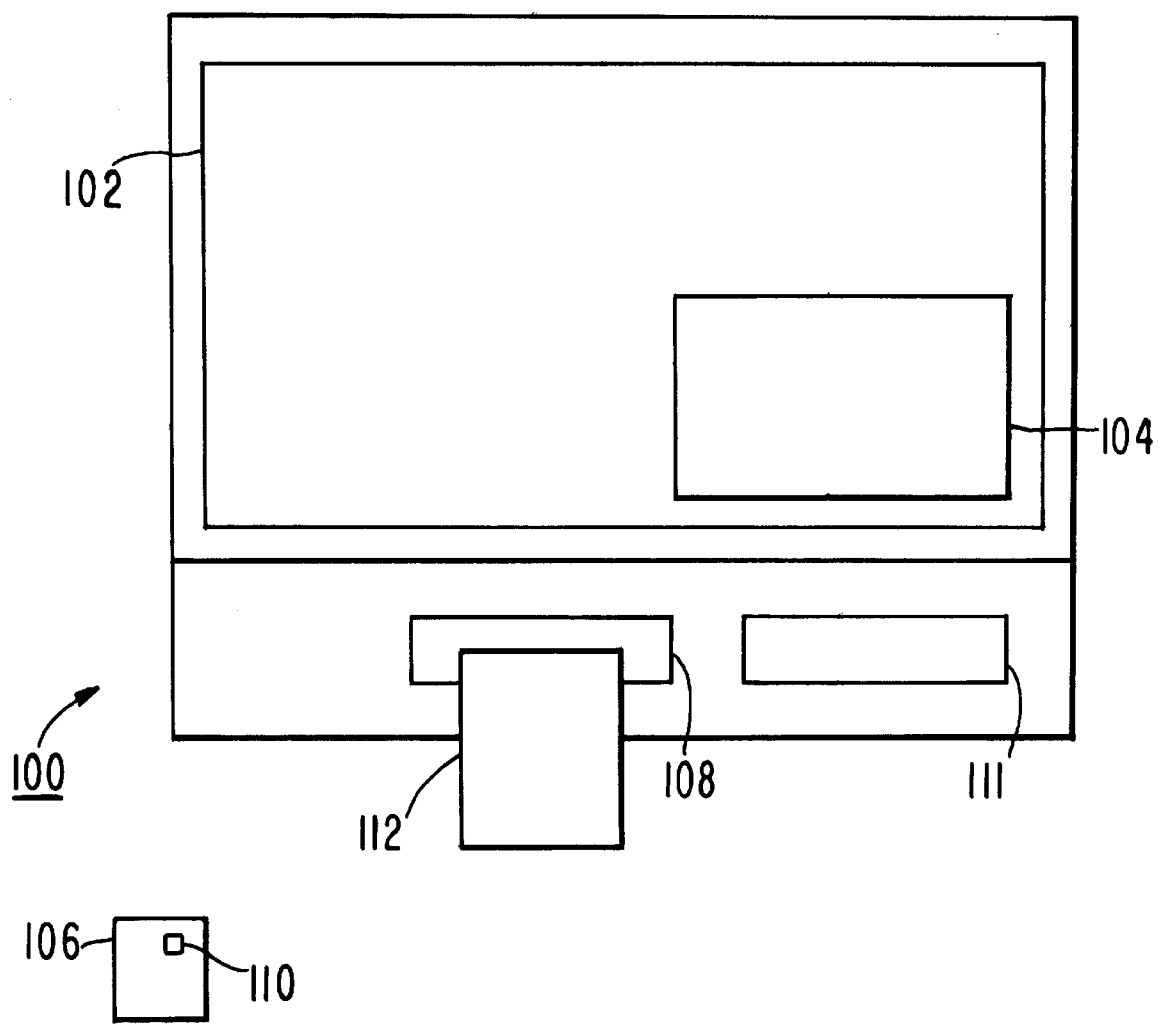
FIG. 1 is an illustration of one embodiment of a system of the present invention integrating a digital television with a video printer into a single unit.

FIG. 1 illustrates a preferred embodiment of a system 100 integrating a digital television with a video printer into a single unit according to the present invention. System 100 includes a display area 102, a split window viewing screen 104, a remote control 106, a printer 108, and a printer control button 110. In an alternate embodiment, system 100 may include a main control panel 111. For illustrative purposes, document 112 is a hard copy of an image selected by a user employing the present invention.

Display area 102 is a conventional monitor display for a digital television which allows images corresponding to the broadcast of compressed real time digital video signals to be displayed and images corresponding to compressed stored digital video signals to be viewed for printing. In a preferred embodiment, system 100 includes split window viewing screen 104 for viewing images corresponding to the stored digital video signals, thus enabling a user to view simultaneously images from a broadcast on display area 102 and images stored for printing on split window viewing screen 104. The dimensions of split window viewing screen 104 may be configured by the user to a desired height and width and therefore, may comprise either a portion of display area 102 or alternatively, the entire display area. For example, FIG. 1 illustrates system 100 with a split window viewing screen 104 comprising approximately one fourth of display area 102.

Remote control 106 is any conventional remote control unit for controlling the functionality and features of system 100. In a preferred embodiment, remote control 106 includes printer control button 110 which allows a user to activate the printer to produce a hard copy of a stored image viewed on split window viewing screen 104. In an alternate embodiment, system 100 includes a main control panel 111. Main control panel 111 is any conventional control panel and allows a user to control the functionality and features of system 100. In such embodiment, printer control button 110 may be located on main control panel 111.

Printer 108 is integrated into system 100 as shown in FIG. 1. Printer 108 is any conventional printing device and in a preferred embodiment, is a color photorealistic printer, such as a Canon Bubble Jet printer.

An image printing operation by system 100 is effected in the following manner. First, when system 100 is in a broadcasting mode, system 100 operates as a conventional digital television enabling a user to view the images of a broadcast on display area 102. When the user desires a hard copy of an image seen during the broadcast, the user activates a print preview mode in system 100 using either remote control 106 or main control panel 111. When the print preview mode is activated, split window screen 104 appears on display area 102. Using remote control 106 or main control panel 111, the user can then view images of the stored broadcast and can select a particular frame of an image to be printed. The user depresses printer control button 110 located on either remote control 106, in a preferred embodiment, or in an alternate embodiment, on main control panel 111, and a hard copy 112 of the selected image is printed from printer 108.

Figure 2:
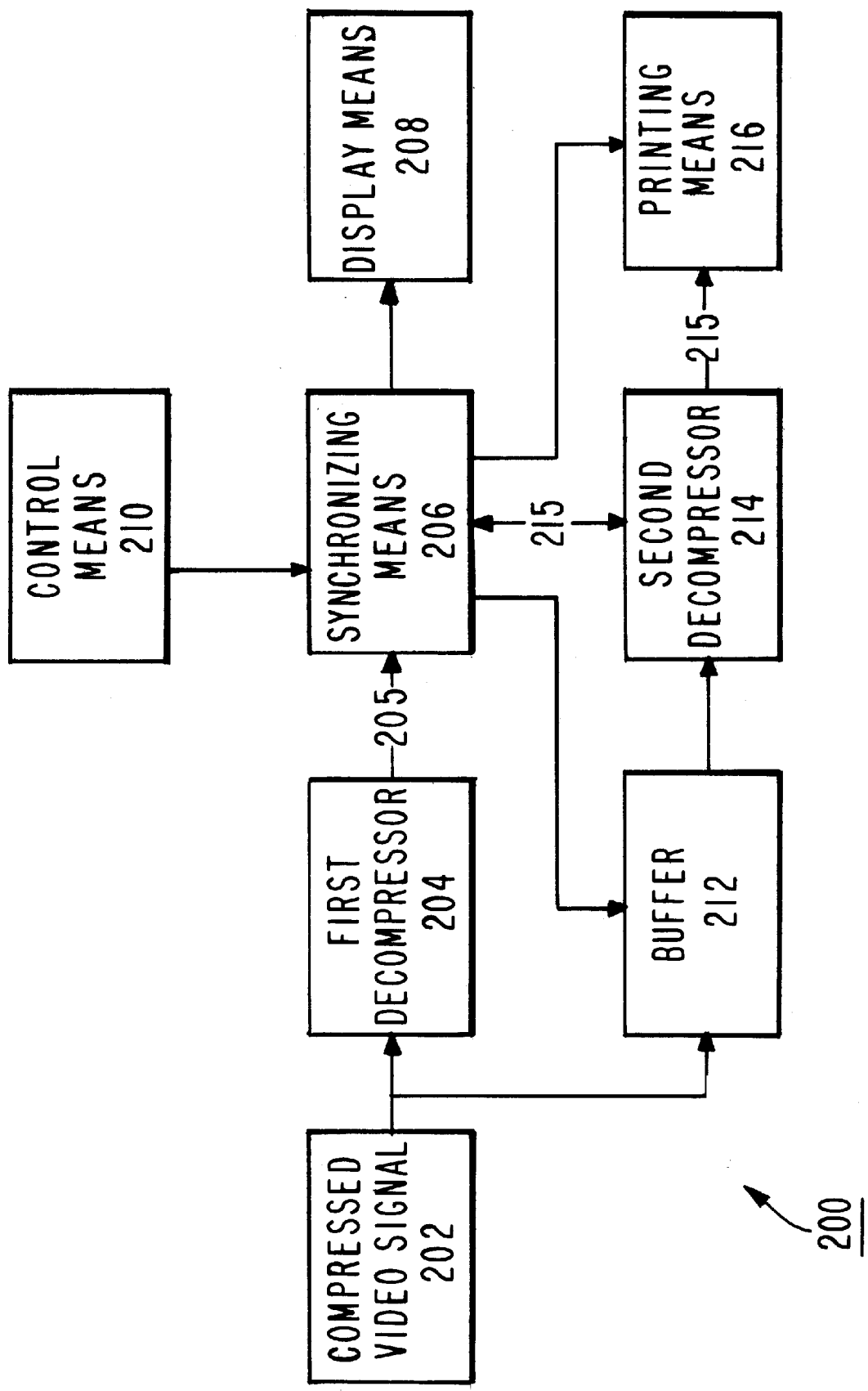
FIG. 2 is a simplified block diagram illustrating the components of one embodiment of the present invention.

FIG. 2 is a simplified block diagram illustrating the components of one embodiment of the present invention. In a preferred embodiment, system 200 includes a compressed video signal 202, a first decompressor 204, a synchronizing means 206, a display means 208, a control means 210, a buffer 212, a second decompressor 214, and a printing means 216.

Compressed video signal 202 is coupled to a first decompressor 204 and buffer 212. Compressed video signal 202 is any digital video signal compressed by conventional video compression techniques, such as the Moving Pictures Expert Group (MPEG) standard.

First decompressor 204 receives compressed video signal 202 and is any conventional decompressor which is usually implicitly defined by the video compression technique employed to compress the video signal. For example, MPEG defines a compressed bit stream syntax and a corresponding decoding process and leaves the encoding process up to invention. First decompressor 204 outputs a decompressed real time digital video signal 205.

Buffer 212 is any type of conventional buffer or memory device, such as a semiconductor memory, in which the compressed digital video signals are stored. Buffer 212 selectively outputs the compressed digital video signal in accordance with control signals received from control means 210.

Second decompressor 214 is coupled to receive an input from buffer 212 for decompressing the stored compressed digital video signal. As with first decompressor 204, second decompressor 214 is any conventional decompressor which is usually determined by the compressor and compression algorithm. The output of second decompressor 214 is a decompressed stored digital video signal 215.

Synchronizing means 206 is coupled to receive decompressed real time digital video signal 205 from first decompressor 204, decompressed stored digital video signal 215 from second decompressor 214, and a control input from control means 210. Synchronizing means 206 synchronizes the display of decompressed real time digital video signal 205 and decompressed stored digital video signal 215. Synchronizing means allows both signals to be displayed simultaneously on display means 208. Synchronizing means may be any type of conventional hardware which is configured to perform the required function, such as a microcontroller circuit.

Control means 210 is coupled to synchronizing means 206 to allow a user to selectively view decompressed stored digital video signal 215 corresponding to images stored in buffer 212 and to print a hard copy of a selected image on printing means 216. Control means 210 may be any conventional control circuit comprising, for example, a remote control 106 as shown in FIG. 1, or in an alternate embodiment, a control panel 111.

Display means 208 is coupled to receive decompressed real time digital video signal 205 from synchronizing means 206 for displaying a real time broadcast corresponding to decompressed real time digital video signal 205 when system 100 is in a broadcasting mode. Display means 208 is also coupled to receive decompressed stored digital video signal 215 from synchronizing means 206 for displaying images stored in buffer 212 when system 200 is operating in a print preview mode. In a preferred embodiment, display means 208 has the capability to display the decompressed real time digital video signal 205 and the decompressed stored digital video signal 215 simultaneously. Preferably, decompressed stored digital video signal 215 is displayed in split window 104 as illustrated in FIG. 1. Display means 208 is any conventional display means appropriate for digital television.

Printing means 216 is coupled to receive decompressed stored digital video signal 215 from second decompressor 214 for printing a hard copy of a selected image in accordance with a control signal received from synchronizing means 216. Printing means 216 is any conventional color photorealistic printing device and in a preferred embodiment, is a Canon Bubble Jet printer.

Figure 3:
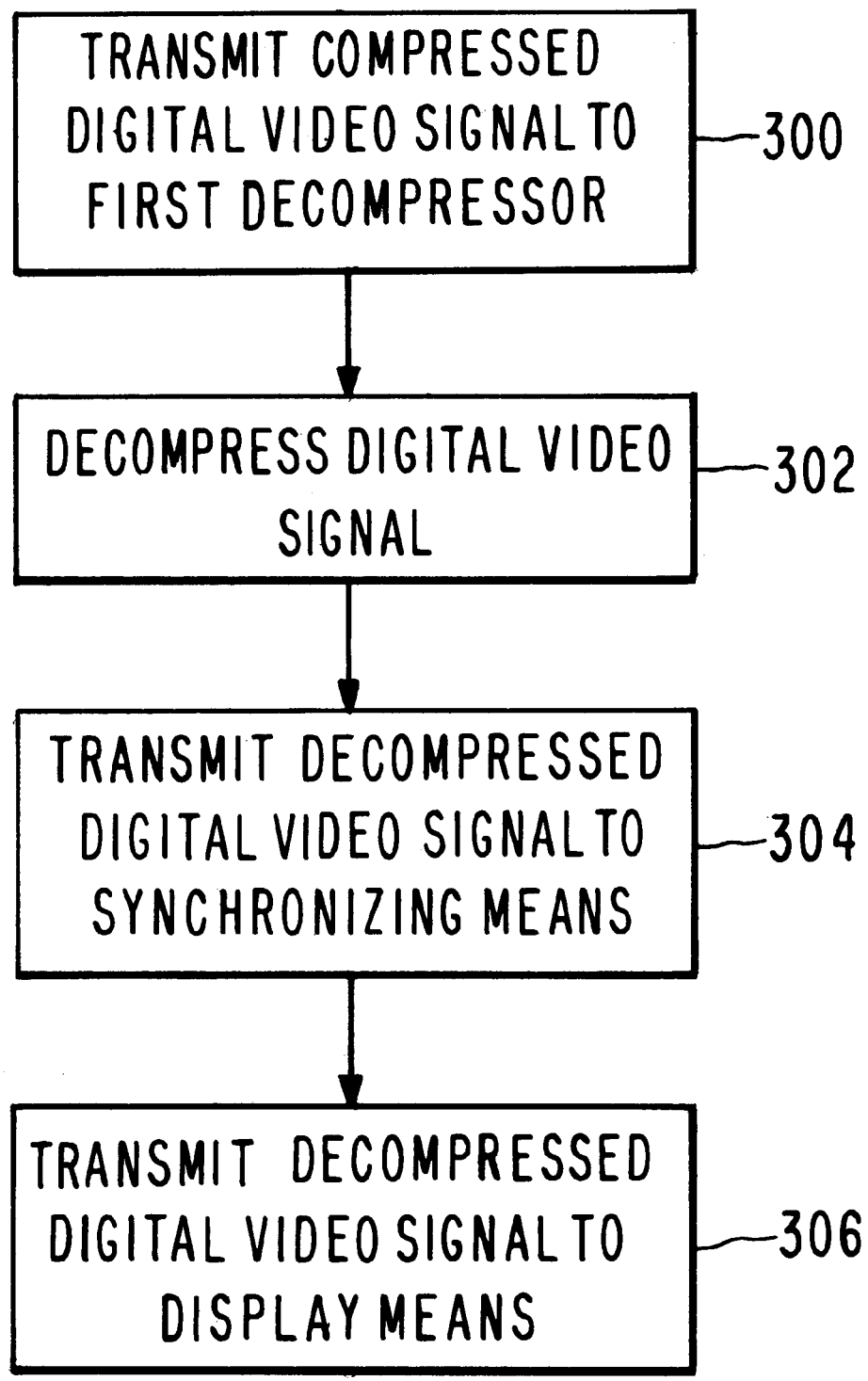
FIGS. 3 is a flowchart diagram illustrating method steps of the present invention operating in a broadcast mode.

FIG. 3 is a flowchart diagram illustrating the method steps of the present invention in a broadcast mode. When system 200 is in broadcast mode, compressed digital video signal 202 is transmitted (300) to first decompressor 204. Compressed digital video signal 202 is then decompressed (302) and transmitted (304) to synchronizing means 206. The decompressed digital video signal 205 is then further transmitted (306) to display means 208, thus enabling a user to view the broadcast corresponding to compressed digital video signal 202.

Figure 4:
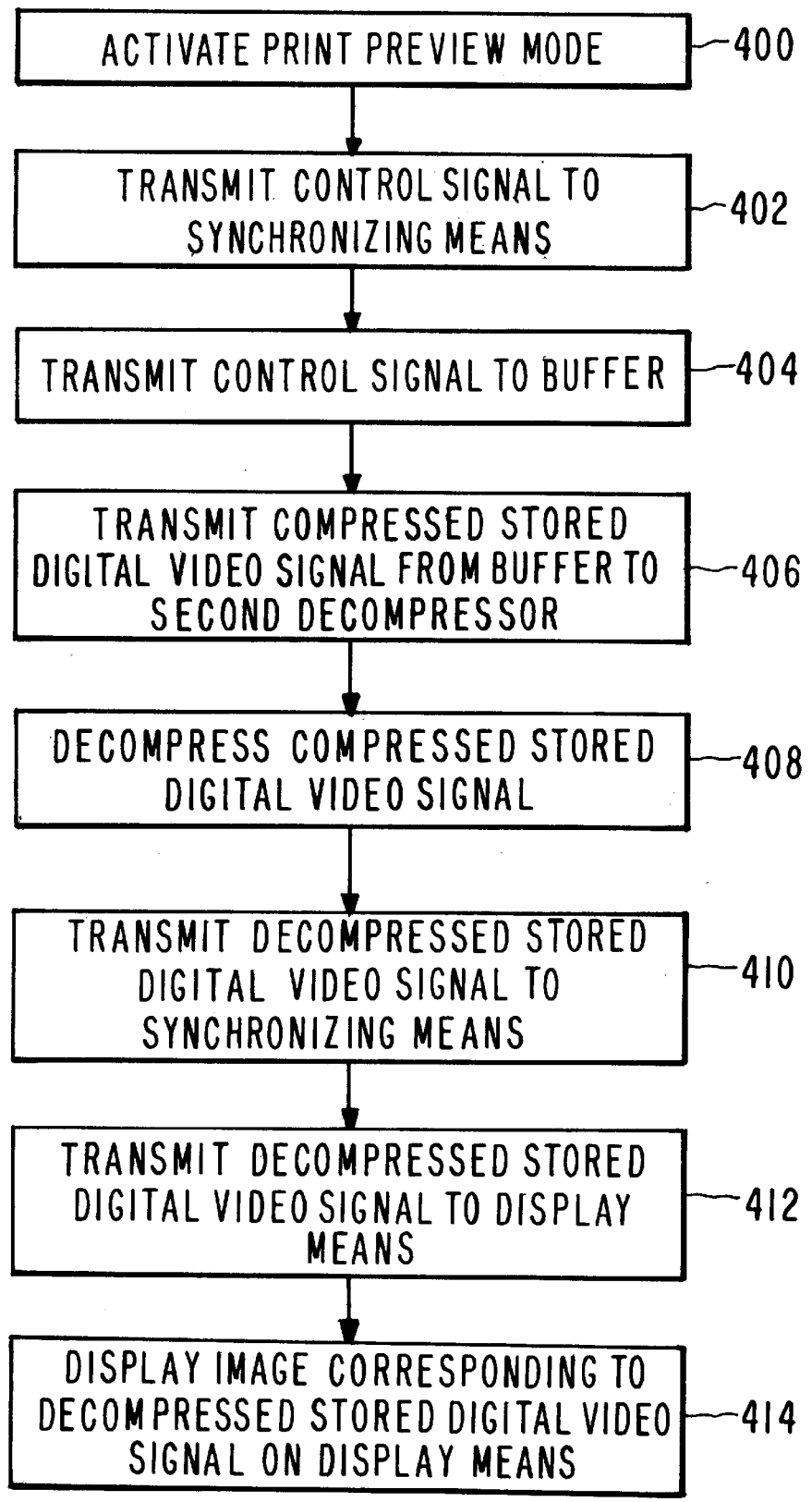
FIG. 4 is a flowchart diagram illustrating method steps of the present invention operating in a print preview mode.

When a user desires a hard copy of an image seen during a broadcast, the user activates a print preview mode in system 200. FIG. 4 is a flowchart diagram illustrating the method steps of the present invention in a print preview mode. Step 400 is performed by the user and the subsequent steps of FIG. 4 are performed by system 200. First, using control means 210, the user activates (400) the print preview mode by pressing a button on control means 210. A control signal is transmitted (402) to synchronizing means 206 which is further transmitted (404) to buffer 212. A compressed stored digital video signal 202 is then transmitted (406) from buffer 212 to second decompressor 214. The compressed stored digital video signal 202 is then decompressed (408) by second decompressor 214 into decompressed stored digital video signal 215. Decompressed stored digital video signal 215 is then transmitted (410) to synchronizing means 206 and is further transmitted (412) to display means 208 where an image corresponding to decompressed stored digital video signal 215 is displayed (414).

Figure 5:
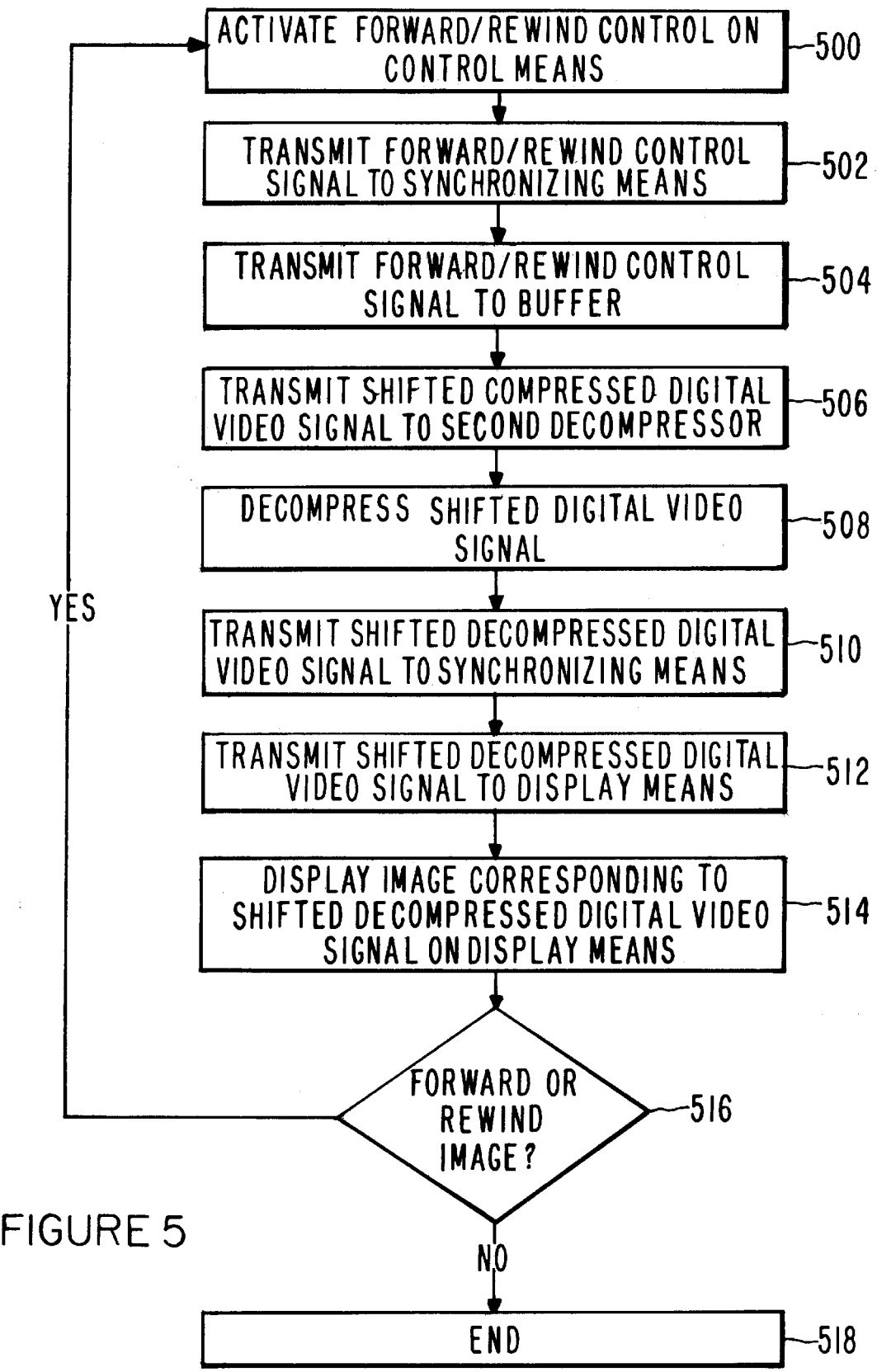
FIG. 5 is a flowchart diagram illustrating method steps of the present invention for viewing stored images in the print preview mode.

When system 200 is in print preview mode, the user can change the viewing direction of the images stored in the buffer, i.e. forward or rewind through the stored images, in order to select an image for printing. FIG. 5 is a flowchart diagram illustrating the method steps for viewing images when system 200 is in print preview mode. Steps 500 and 516 are performed by the user and the remaining steps in FIG. 5 are performed by system 200. Using control means 210, the user activates (500) the direction changing capability of system 200, i.e. forward or rewind controls, by pressing the appropriate button on control means 210. The forward or rewind control signal is transmitted (502) to synchronizing means 206 which further transmits (504) the control signal to buffer 212. Buffer 212 then transmits (506) the compressed digital video signal which has been shifted either forward or backward according to the received forward or rewind control signal to second decompressor 214. The shifted compressed stored digital video signal is then decompressed (508) by second decompressor 214 into decompressed stored digital video signal 215. Decompressed shifted stored digital video signal 215 is then transmitted (510) to synchronizing means 206 and is further transmitted (512) to display means 208 and an image corresponding to the shifted decompressed stored digital video signal is displayed (514). The user can then decide (516) whether or not to continue forwarding or rewinding through the images stored in buffer 212. If the user desires to forward or rewind through the stored images, the user activates the forward or rewind control on the control means and steps 500 through 514 are repeated.

Figure 6:
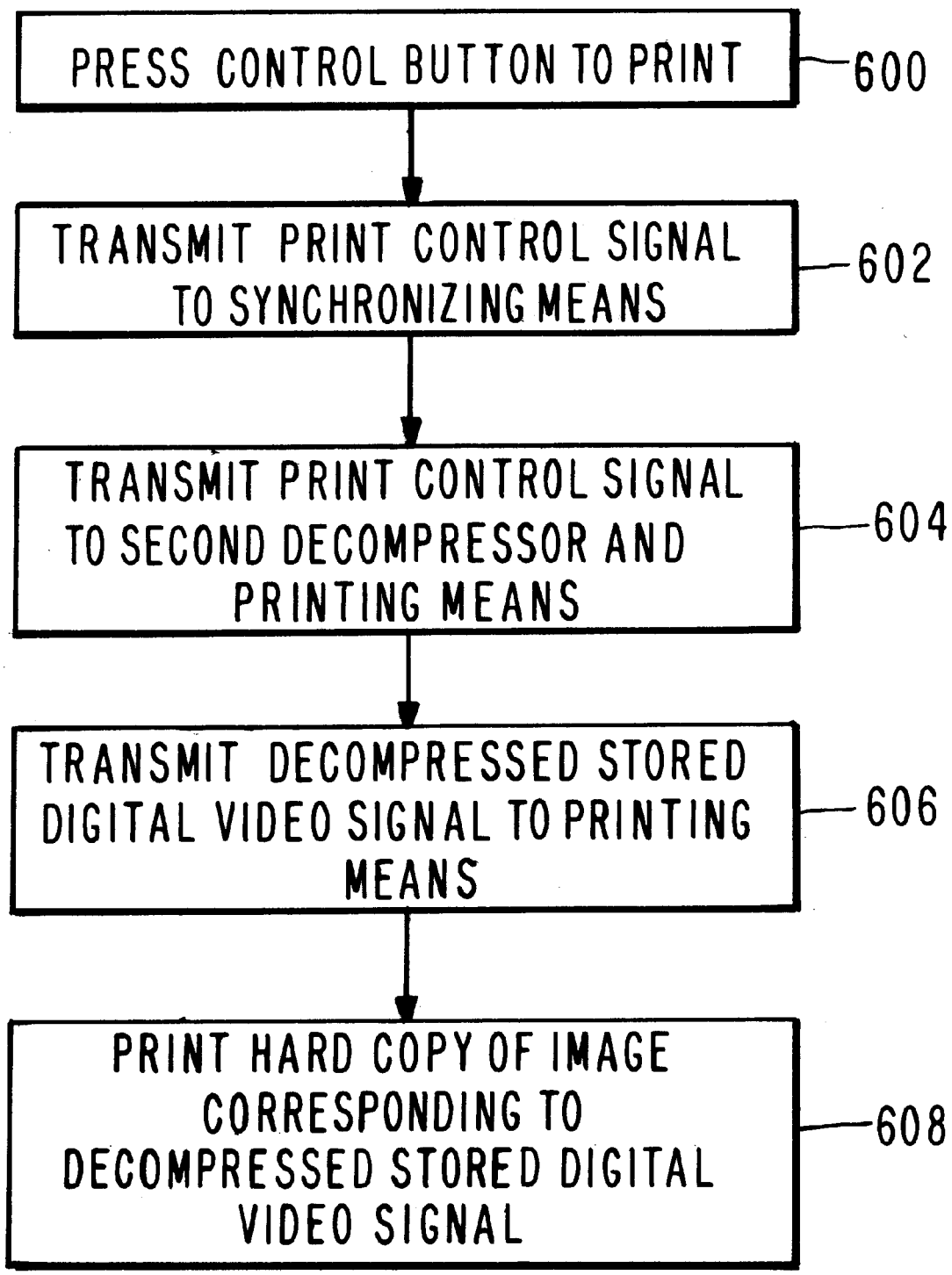
FIG. 6 is a flowchart diagram illustrating method steps of the present invention for printing a hard copy of a stored image.

The user can then print an image displayed on display means 208 during the print preview mode. FIG. 6 is flowchart diagram illustrating the method steps for printing an image corresponding to a stored digital video signal. Step 600 is performed by the user and the remaining steps in FIG. 6 are performed by system 200. The user activates a print operation by pressing (600) a printer control button on control means 210. The printing control signal is transmitted (602) to synchronizing means 206 which further transmits (604) the printing control signal to second decompressor 214 and printing means 216. Second decompressor 214 then transmits (606) the decompressed stored digital video signal to printing means 216 which then outputs (608) a hard copy of the selected image.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. An integrated digital television and video printing system for printing a static image from a compressed digital video signal, the system comprising:

a first decompressor, coupled to receive the compressed digital video signal, for decompressing the compressed digital video signal in real time;

a buffer, coupled to receive the compressed digital video signal, for storing a static image from the compressed digital video signal;

a second decompressor, coupled to the buffer, for decompressing the static image stored in the buffer;

a synchronizing means, coupled to the first and second decompressors, for synchronizing the decompressed real-time video signal and the static image so that a real-time image corresponding to the real-time video signal and the static image can be simultaneously displayed;

a display means, coupled to the synchronizing means, for simultaneously displaying thereon the real-time image and the static image; and a printing means, coupled to the second decompressor, for producing a hard copy of the decompressed static image.

2. The system of claim 1 wherein the compressed digital video signal is compressed using MPEG compression.

3. The system of claim 1 wherein the configuration of the first and second decompressors is determined by MPEG compression.

4. The system of claim 1 wherein the display means provides split windows for viewing simultaneously the static image and the real-time image.

5. A video processing device, comprising:

a first decompressor, receiving a compressed digital video signal, for decompressing the compressed digital video signal to output a real-time video signal which sequentially includes continuous frames;

a buffer memory, receiving the compressed digital video signal, for storing at least one static image from the compressed digital video signal including information corresponding to at least one frame;

a second decompressor, coupled to the buffer memory, for decompressing at least one static image from the compressed digital video signal to output a static image signal; and a synchronizer, coupled to said first and second decompressors, for synchronizing the real-time video signal and the static image signal so as to simultaneously display both a real-time image and a static image.

6. A device according to claim 5, further comprising a step of outputting the static image signal so as to output a static image only.

7. A device according to claim 5, wherein said synchronizer synchronizes the real-time video signal and the static image signal so that the real-time image and the static image are overlapped on a display.

8. A device according to claim 7, further comprising a display receiving an output signal of the synchronizer to display both a real-time image and a static image.

9. A device according to claim 7, further comprising a step of simultaneously displaying the real-time image and the static image.

10. A device according to claim 7, further comprising a step of printing the static image signal.

11. A device according to claim 5, further comprising output means for outputting the static image signal so as to output a static image only.

12. A device according to claim 11, further comprising a printer receiving an output signal of said output means to print the static image.

13. A video processing method, comprising steps of:
receiving a compressed digital video signal;
decompressing the compressed digital video signal to output a real-time video signal which sequentially includes continuous frames;
storing at least one static image of the compressed digital video signal including information corresponding to at least one frame;
decompressing at least one static image of the compressed digital video signal to output a static image signal; and
synchronizing the real-time video signal and the static image signal so as to simultaneously display both a real-time image and a static image.

14. A method according to claim 13, wherein the real-time video signal and the static image signal are synchronized in said synchronizing step so that the real-time image and the static image are overlapped on a display.

* * * * *